United States Patent [19]
Goel et al.

[11] Patent Number: 5,995,613
[45] Date of Patent: Nov. 30, 1999

[54] METHOD FOR ESTABLISHING VIRTUAL PRIVATE LINE FOR LONG DISTANCE CARRIER

[75] Inventors: Anurag Goel, Tinton Falls; Ami Parekh, Aberdeen; Gary D. Walden, Califon, all of N.J.

[73] Assignee: AT&T Corp, New York, N.Y.

[21] Appl. No.: 08/942,677

[22] Filed: Oct. 2, 1997

[51] Int. Cl.[6] .................................................. H04M 7/00
[52] U.S. Cl. ......................... 379/221; 379/220; 379/207
[58] Field of Search .................................... 379/219, 220, 379/221, 229, 230, 207

[56] References Cited

U.S. PATENT DOCUMENTS

| | | | |
|---|---|---|---|
| 4,555,594 | 11/1985 | Friedes et al. | 379/220 |
| 4,577,066 | 3/1986 | Bimonte et al. | 379/221 |
| 4,866,763 | 9/1989 | Cooper et al. | 379/221 |
| 5,553,129 | 9/1996 | Partridge et al. | 379/211 X |
| 5,848,140 | 12/1998 | Foladare et al. | 379/220 X |
| 5,901,213 | 5/1999 | Benhabib et al. | 379/220 |

*Primary Examiner*—Creighton Smith

[57] ABSTRACT

A service that provides a virtual private line between a local exchange and another interexchange carrier. To provide the virtual private line, a switch in a first interexchange carrier receives a code representative of the carrier of choice. The switch identifies the second interexchange carrier from the code, and identifies a location of a point of interface between the first and second interexchange carriers. The switch establishes a call path from itself to the second interexchange carrier through the point of interface.

27 Claims, 4 Drawing Sheets

METHOD FOR ESTABLISHING VIRTUAL PRIVATE LINE FOR LONG DISTANCE CARRIER

BACKGROUND OF THE INVENTION

The present invention relates to a communication service wherein a first communication carrier establishes a virtual private line for a second, typically smaller communication carrier.

In the long distance communication services market, a variety of small long distance carriers have entered the market following the decentralization of the United States communication infrastructure. These smaller carriers typically own and maintain few communication switches relative to the larger carriers. Indeed, a small long distance carrier may provide long distance services with even a single switch.

A simplified model of the public switched telephone network is shown in FIG. 1. The public switched telephone network actually is an integrated combination of a variety of communication networks. Local Exchange Carriers ("LECS") typically provide regional communication services to telephone subscribers. The LEC provides communication equipment that connects directly to the subscribers'telephone equipment. Long distance carriers route calls from one LEC to another. Because the long distance carrier interconnects LECS, it is referred to as an Inter Exchange Carrier ("IXC"). In practice, there are several IXCS that provide long distance carrier services. Each IXC provides a physical connection from its network to each LEC that the IXC serves.

To conform to the model shown in FIG. 1, a small IXC having only a small number of switches would provide physical connections to each LEC that it serves. The small IXC would do so by providing a separate optical or electrical cable, such as a T1 trunk, to carry communication traffic between its switch and a switch in the LEC. Installation and maintenance of such cables is expensive, particularly when the cable must connect a switch to a geographically distant LEC.

Maintenance of such cables also possesses a disadvantage due to the fixed capacity of the cables themselves. A single T1 trunk possesses sufficient capacity to serve twenty-four (24) calls. During periods of heavy use, the fixed capacity of the cable may become exhausted even though the switch possesses sufficient capacity to service additional calls. The capacity of the cable limits the number of calls the small IXC could serve from a particular LEC.

To circumvent these problems, the small IXC typically allies itself with a larger IXC. Under such an alliance, requests for long distance services that are meant to be serviced by the small IXC are handled, in fact, by the large IXC. The large IXC completes call connections and bills the small IXC. The large IXC may complete call connections without resort to the small IXC's switch.

The routing function is accomplished through use of a Carrier Identification Code ("CIC") . For each call, the telephone subscriber may designate a long distance carrier of choice by identifying a CIC as part of the dialing sequence. For example, laypersons may be familiar with the 1-0-ATT ("10288") dialing prefix to designate AT&T, the assignee of the present invention, as the carrier of choice. Other CIC codes designate other carriers. When a subscriber at an originating LEC designates a small IXC that is not physically connected to the subscriber's LEC, the LEC routes the call to a large IXC that completes the call. The large IXC uses the CIC for billing purposes to charge the small IXC for the connection.

Using the large IXC's service, the small IXC may reduce the number of physical connections made to LECS when the large IXC handles calls originating from LECS to which the small IXC provides no connection. The success of this service has caused small IXCS to abandon the expense of private lines in favor of an alliance with the large IXCS. For a fee, the large IXCS carry all communication traffic of some small IXCS, not just overflow traffic.

The fee charged by the large IXCS reduces revenue earned by the small IXC. To increase their revenue, small IXCS are exhibiting a preference to include their switch(es) in call routing for customers that they serve. They desire that the large IXC route long distance traffic for its customers from an originating LEC to the small IXC's switch as a first leg. To complete the second leg, from the small IXC's switch to a destination LEC, the small IXC may route the call to the same or a different large IXC or may maintain its own physical connection.

There is a need in the art for a communication service among IXCS wherein a first IXC provides a virtual private line for a second, typically smaller, IXC in which the first IXC routes communication from an originating LEC to the second IXC's network.

SUMMARY OF THE INVENTION

The disadvantages of the prior art are alleviated to a great extent by a service that provides a virtual private line between a local exchange and another interexchange carrier. To provide the virtual private line, a switch in a first interexchange carrier receives a code representative of the carrier of choice. The switch identifies the second interexchange carrier from the code, and identifies a location of a point of interface between the first and second interexchange carriers. The switch establishes a call path from itself to the second interexchange carrier through the point of interface.

DETAILED DESCRIPTION

The present invention establishes a virtual private line from a LEC to a first IXC through a second IXC. For the purposes of presentation, the two IXCS are labeled "small IXC" and "large IXC." However, it should be understood that the size and resources of the IXCS are immaterial to the scope of the present invention. The labels are chosen solely to facilitate the presentation. The present invention finds application where any IXC provides a virtual private line for a second IXC, regardless of whether the first IXC is larger, smaller or equal in size to the second IXC.

Figure 1:
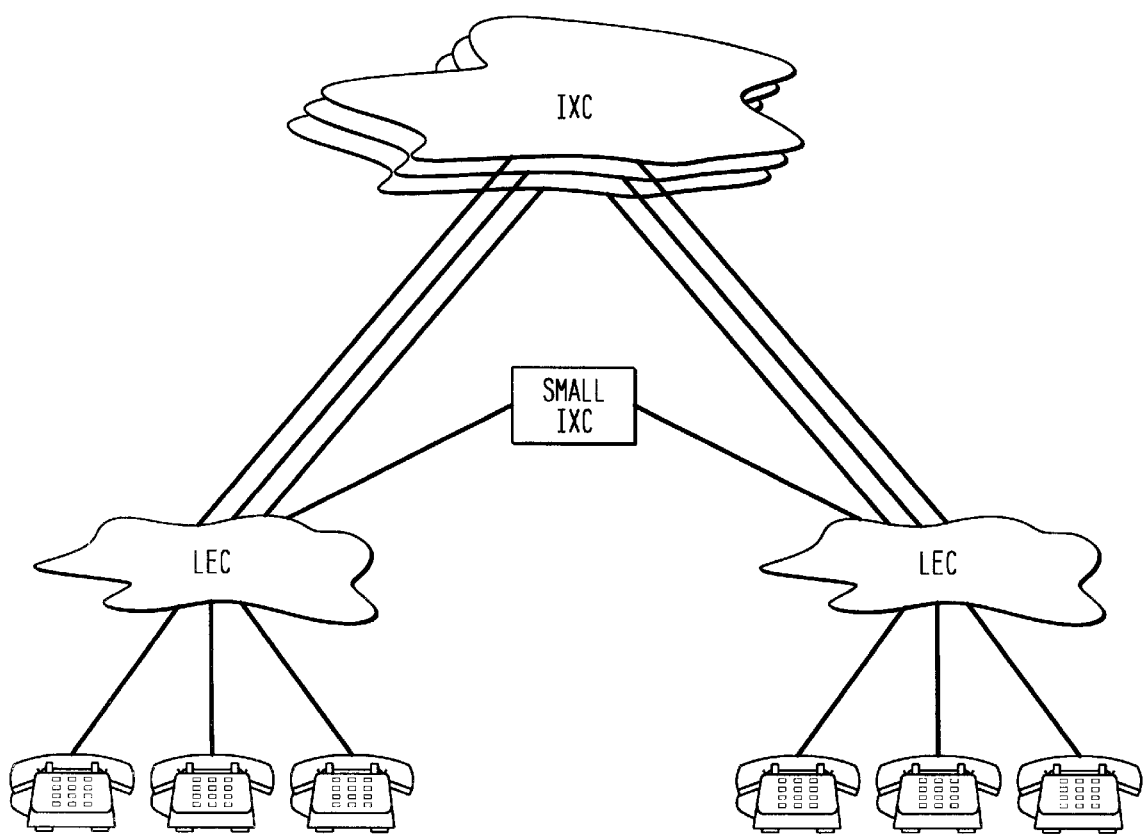
FIG. 1 is an illustration of a public switched telephone network.
Figure 2:
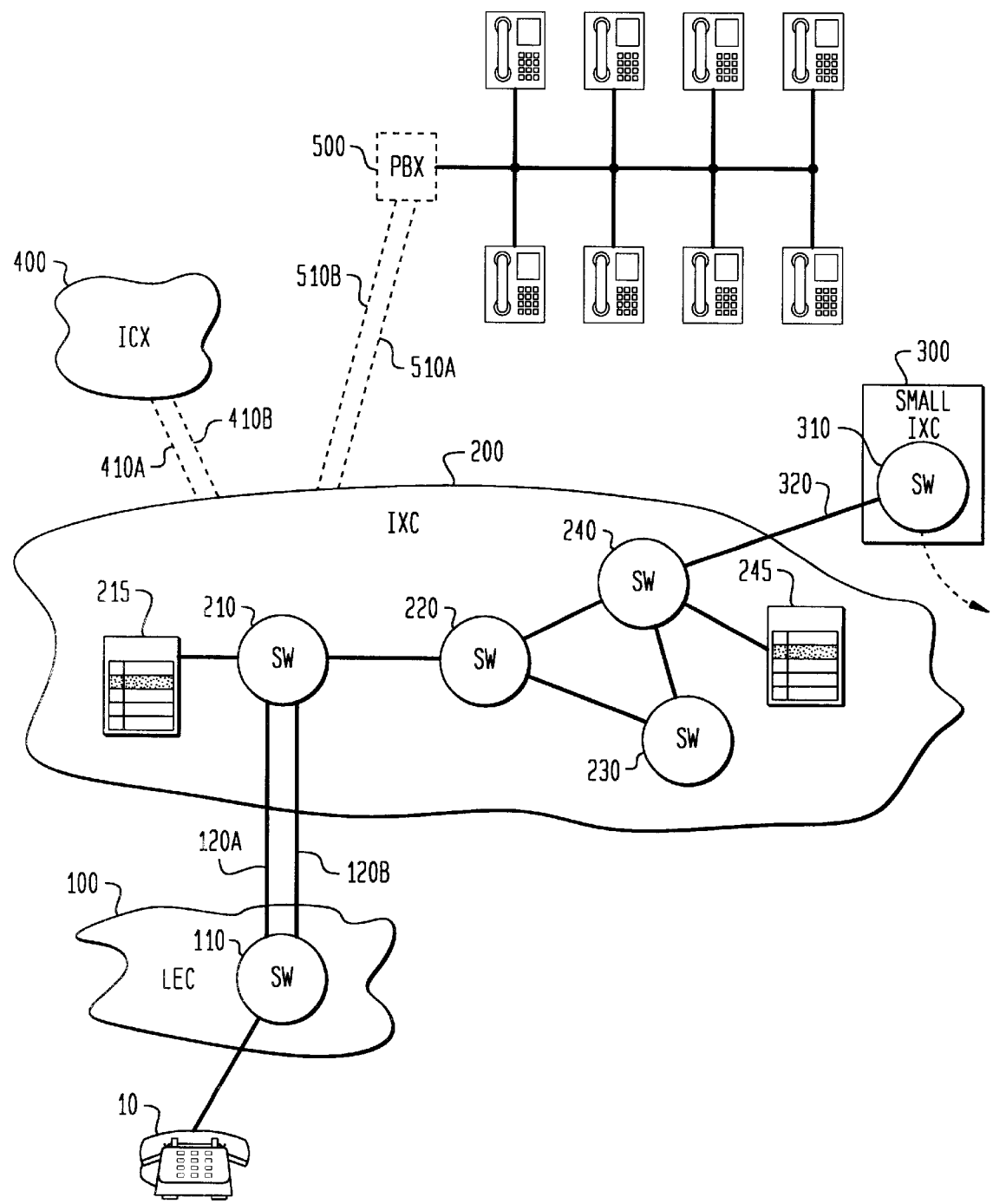
FIG. 2 is an illustration of communication networks adapted to employ the present invention.

FIG. 2 illustrates components in which the present invention may be applied. A LEC 100 contains at least one communication switch 110 that connects directly to ordinary telephone equipment 10, such as for example domestic telephones and pay phones. The LEC switch 110 may connect also to private branch exchanges (not shown). A typical switch in a LEC 100 is a model 5ESS®, commercially available from Lucent Technologies of Murray Hill, N.J. The LEC switch 100 also connects to a switch 210 in an IXC 200.

The large IXC 200 is populated by communication switches 210–240 that route communication traffic throughout the large IXC 200. The switches 210–240 are interconnected by optical or electrical cable carrying the communication traffic, such as T1 trunks. For each individual call carried by the large IXC 200, the large IXC 200 establishes a call path. Each LEC served by the large IXC 200 is connected to at least one switch in the large IXC 200 (switch 210 in the example of FIG. 2). Also, at least one switch in the large IXC 200 interconnects to a switch 310 in the small IXC 300 at a point of interface (interconnecting trunk 320 in FIG. 2). The switches of the large IXC 200 may be model 4ESS™ switches, also commercially available from Lucent Technologies.

A switch from the large IXC 200 that interconnects with switches from a LEC or another IXC is provided with a memory table that associates CIC codes with other switches of the large IXC 200 that provide points of interface to the IXCS identified by the codes. For example, switch 210 interconnects with a switch from the LEC 100. Switch 210 possesses such a memory table, shown as 215 in FIG. 2. The memory table associates the small IXC's CIC code with switch 240.

To initiate long distance communication, a subscriber generates an off hook condition at telephone 10 and enters a sequence of dialed digits that includes a telephone number of a destination party. The sequence may or may not include a CIC code. If the sequence does not include a CIC code, the LEC switch 110 refers to an account profile of the subscriber to identify a CIC code that is used by default. The present invention is invoked when the CIC designates the small IXC 300, one that provides no connection to the LEC 100.

Figure 3:
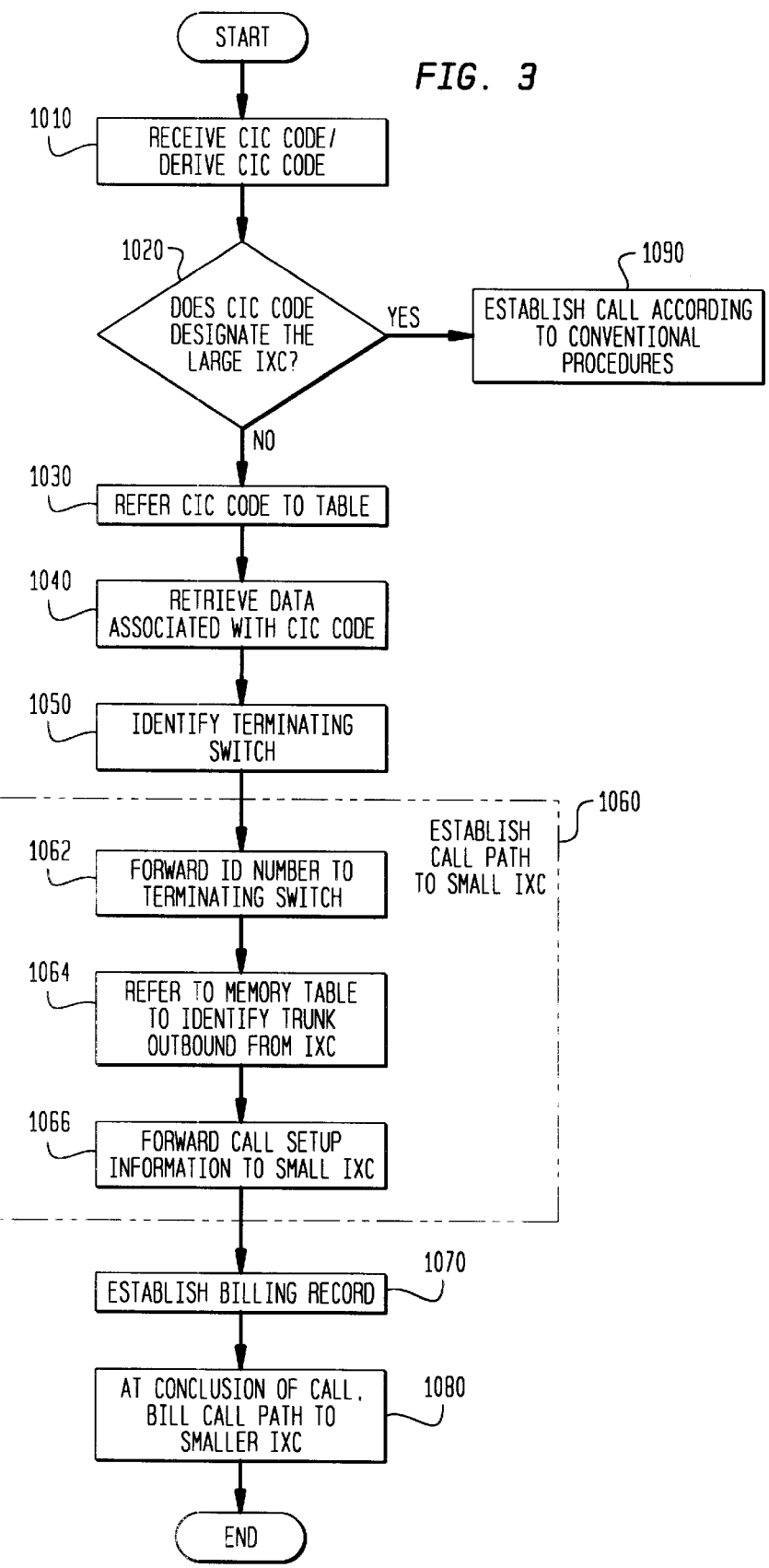
FIG. 3 is a flow diagram illustrating a first method of operation of a switch according to the present invention.

A method of operation of switch 210, the one communicating with the LEC 100, is shown in FIG. 3. The LEC switch 110 establishes communications with the large IXC 200 according to a call setup protocol established between the large IXC 200 and the LEC 100. As part of the call setup, switch 210 receives the telephone number entered at telephone 10 and the CIC code (Step 1010). The large IXC 200 checks the CIC code and determines that the CIC code references the small IXC 300 (Step 1020).

When the switch 210 determines that the CIC code designates another IXC, switch 210 queries the table 215 with the CIC code (Step 1030). The switch 210 retrieves a data record associated with the CIC code and identifies switch 240 as a "terminating switch", the switch that provides a point of interface to the small IXC 300. (Steps 1040 and 1050).

Switch 210 establishes a call path from the LEC 100 through the large IXC 200 to the small IXC 300 (Step 1060). Within the large IXC 200, the call path may traverse, for example, switches 210, 220 and 240.

As part of step 1060, switch 210 translates the CIC code to an ID number identifying the small IXC 300 and forwards the ID number to switch 240 (Step 1062). Switch 240 is provided with its own memory table 245. Table 245 associates ID numbers with trunks outbound from the switch 240. Thus, when the call path is established from switch 210 to switch 240 and when switch 240 receives the ID number, switch 240 refers to the memory table 245 to determine which trunk should be used to extend the call path through to the small IXC 300 (Step 1064). When the call path is established, switch 240 provides the dialed information entered by the subscriber to the small IXC switch 310 (Step 1066).

For providing the connection between the LEC 100 and the small IXC 300, the large IXC 200 bills the small IXC 300. Switch 210 generates an Automated Message Accounting ("AMA") billing record according to procedures known in the art (Step 1070). In contrast to conventional billing records, the AMA billing record associated with this services identifies the small IXC 300 as the party to be billed. The switch 210 monitors the progress of the call and completes the billing process when the call ends (Step 1080).

Of course, if at step 1020 switch 210 determines that the CIC code references the large IXC 200 (the IXC to which switch 210 belongs), the switch 210 completes call setup according to its normal procedures (Step 1090).

The present invention routes telephone calls almost exclusively based on CIC codes. Such routing largely is made without regard to the telephone number entered by the calling party at telephone 10. However, exceptions exist mainly in circumstances where the telephone number dialed indicates some kind of directory assistance (1-0-CIC+1-XXX-555-1212) or operator assistance (1-0-CIC+0). Before step 1040, the switch may test the dialed telephone number to determine if such special exceptions exist (step not shown). When they exist, the switch interrupts the method of FIG. 3 and establishes a call path as dictated by the CIC and the dialed telephone number.

The CIC code need not be transmitted as a digital data signal from a LEC 100 to the large IXC 200. In certain applications, the LEC 100 and IXC 200 may be interconnected by a plurality of trunks 120A, 120B. The LEC 100 and IXC 200 may have a predefined signaling protocol in which all calls routed to the IXC 200 over one of those trunks, say 120B, are associated with a predetermined CIC code that references another IXC (such as small IXC 300). In such a case, switch 210 derives a default CIC code for all calls received over the one trunk 120B unless another CIC code is supplied by the LEC 100 over the trunk. In this case, switch 210 derives the CIC code for a call rather than having the CIC code provided expressly by the LEC 100.

The present invention has been described above with reference to a call originating in a LEC 100 and traversing a first IXC 200 to a second IXC 300. However, the invention is not limited to interconnections between LECS and other IXCS.

In an alternative, the present invention finds application when call setup information is provided to the large IXC 200 from an intermediate IXC 400 (shown in phantom in FIG. 2). There, the intermediate IXC 400 signals the large IXC 200 identifying the dialed number entered by a calling party. The intermediate IXC 400 may provide the CIC expressly to the large IXC 200. In this case, switch 210 operates as shown in FIG. 3 to route the call to the small IXC 300. Alternatively, the switch 210 may derive the CIC code in a manner analogous to that described above with respect to the LEC 100. In this case, the intermediate IXC 400 and the large IXC 200 interconnect over a plurality of trunk lines, 410A and 410B, at least one of which (say, 410B) is associated with the small IXC's CIC code. By default, switch 210 associates the small IXC's CIC code with all calls received over the one trunk 410B unless a different CIC code is provided expressly.

In another alternative, the present invention finds application when call setup information is provided to the large IXC 200 from a Private Branch Exchange ("PBX") 500

(also shown in phantom in FIG. 2). There, the PBX 500 signals the large IXC 200 identifying the dialed number entered by a calling party. The PBX 500 may provide the CIC code expressly to the large IXC 200. In this case, switch 210 operates as shown in FIG. 3 to route the call to the small IXC 300. Alternatively, the switch 210 may derive the CIC code in a manner analogous to that described above with respect to the LEC 100. In this case, the PBX 500 and the large IXC 200 interconnect over a plurality of trunk lines, 510A and 510B, at least one of which (say, 510B) is associated with the small IXC's CIC code. By default, switch 210 associates the small IXC's CIC code with all calls received over the one trunk unless a different CIC code is provided expressly.

Figure 4:
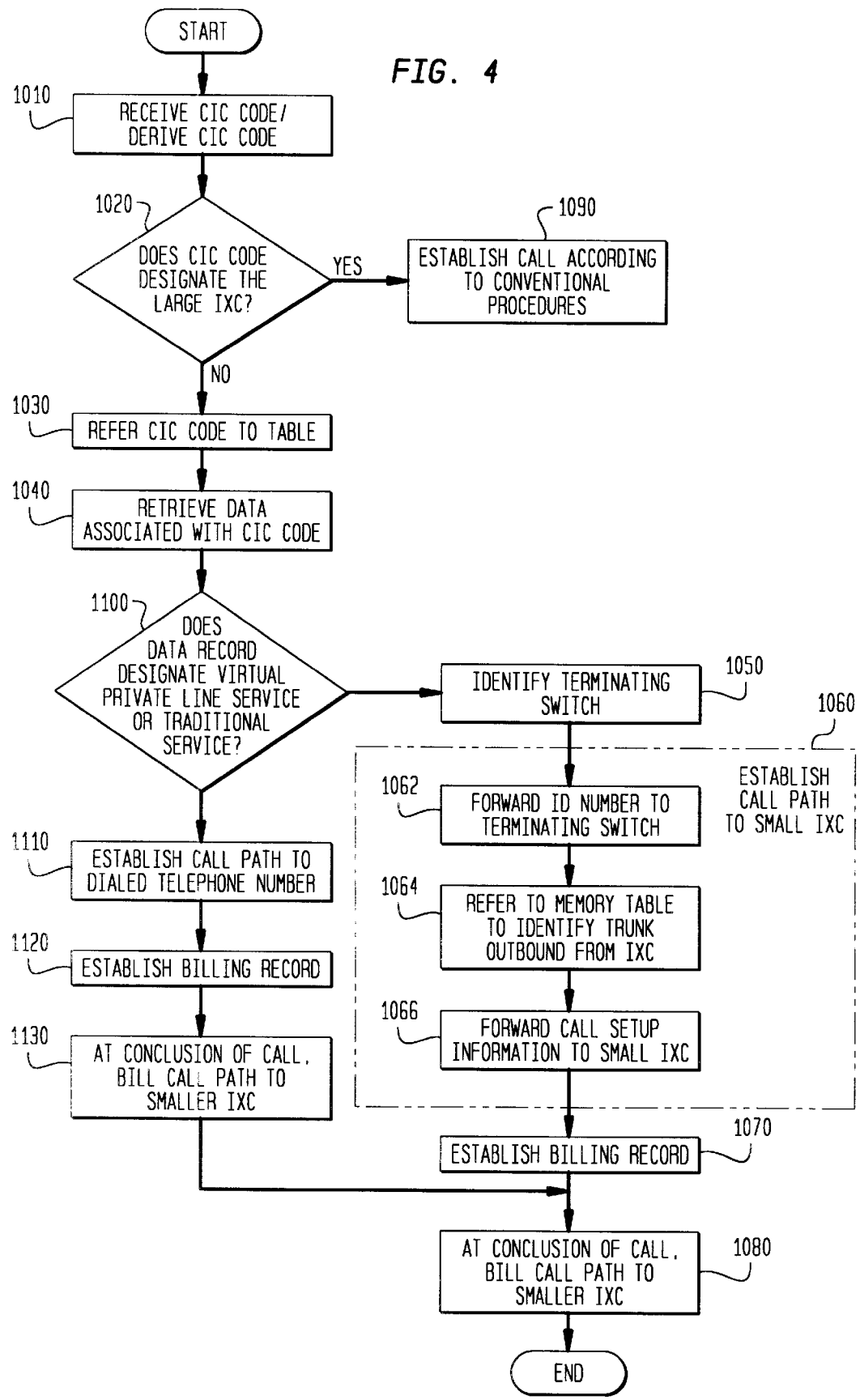
FIG. 4 is a flow diagram illustrating a second method of operation of a switch according to the present invention.

The method shown above provides a virtual private line, a virtual trunk, to the small IXC 300. It does not establish a telephone to telephone connection. However, the virtual private line service may be integrated into a service that provides the traditional end to end connection service, where the large IXC 200 completes the entire call connection and bills the small IXC 300. The method of operation is shown in FIG. 4.

If the large IXC 200 offers both the traditional end to end service and the new virtual private line service, the Table 215 may associate the CIC codes of the various small IXCS 300 with the type of service they desire. During call setup, the method progresses through steps 1010–1040 as in FIG. 3. After step 1040, the switch 210 determines from the data record which type of service is predetermined (Step 1100). If the data record designates the virtual private line service, the switch 210 advances to step 1050 and follows the method as described with respect to FIG. 3.

If the database designates the traditional service, the switch 210 completes the call connection as dictated by the telephone number entered at telephone 10 (Step 1110). Also, it establishes a billing record and bills the small IXC 300 for the connection, providing an identifier of the dialing subscriber in the billing record (Steps 1120 and 1130).

The present invention provides a virtual private line service of a first IXC for a second IXC. The virtual private line service of the present invention complements traditional service afforded small IXCS by larger IXCS and may be integrated into a service whereby both types of service, both traditional and virtual private line, may be provided.

Several embodiments of the present invention are specifically illustrated and described herein. However, it should be appreciated that modifications and variations of the present invention are covered by the above teachings and within the preview of the appended claims without departing from the spirit and intended scope of the invention.

We claim:

1. A method of routing a call received by a first interexchange communication network to a second interexchange communication network, comprising the steps of:

receiving a code associated with the call, determining whether the code identifies the second network, and when the code identifies the second network, identifying a point of interface between the first and second networks, and routing the call to second network through the point of interface.

2. The method of claim 1, wherein the receiving step includes a step of deriving the code from a path in which the call is received.

3. The method of claim 1, wherein the receiving step includes a step of receiving a signal representing the code.

4. The method of claim 1, wherein the call is received by the first network from a local exchange carrier.

5. The method of claim 1, wherein the call is received by the first network from a third interexchange carrier.

6. The method of claim 1, wherein the call is received by the first network from a private branch exchange.

7. The method of claim 1, further comprising steps of:

generating a billing record relating to a call path established by the routing step, and billing the second network for the call path.

8. The method of claim 1 wherein the code is a CIC code.

9. The method of claim 1, wherein the identifying step includes steps of:

referring the code to a memory table, and retrieving from the table data associated with the code, the data identifying a terminating switch in the first network associated with the point of interface.

10. The method of claim 1, further comprising, when the code does not identify the second network, steps of:

determining whether the code designates the first network itself, and when the code designates the first network, establishing a call path from the third network to a network address identified by the telephone number.

11. In a first interexchange communication network, a method of processing a call associated with a second interexchange communication network, comprising the steps of:

receiving a code associated with the call, determining whether the code identifies the second network, when the code identifies the second network, identifying a preferred mode of service of the second network, and when the preferred mode of service is a virtual private line service, identifying a point of interface between the first and second networks, and routing the call to the second network through the point of interface.

12. The method of claim 11, wherein the receiving step includes a step of deriving the code from a path in which the telephone number is received.

13. The method of claim 11, wherein the receiving step includes a step of receiving a signal representing the code.

14. The method of claim 11, wherein the call is received by the first network from a local exchange carrier.

15. The method of claim 11, wherein the call is received by the first network from an interexchange carrier.

16. The method of claim 11, wherein the call is received by the first network from a private branch exchange.

17. The method of claim 11, wherein the receiving step includes a step of receiving a telephone number identifying a party to be called, the method further comprising a step of, when the preferred mode of service is an end to end service, routing the call based on the telephone number.

18. The method of claim 11, further comprising steps of:

generating a billing record relating to a call path established by the routing step, and billing the second network for the call path.

19. The method of claim 11, wherein the code is a CIC code.

20. The method of claim 11, wherein the identifying step includes steps of:

referring the code to a memory table, and retrieving from the memory table data associated with the code, the data identifying a terminating switch in the first network associated with the point of interface.

21. The method of claim 11, further comprising steps of:

receiving with the code a telephone number of a party to be called, and when the code does not identify the second network:
  determining whether the code designates the first communication network, and
    when the code designates the first communication network, routing the call based upon a network address identified by the telephone number.

22. A method of routing a call received by a first interexchange communication network to a second interexchange communication network, comprising the steps of:

receiving a code associated with the call, the code identifying a carrier of choice, determining whether the code identifies the second network, and when the code identifies the second network,
  identifying a point of interface between the first and second networks, and
  routing the call to second network through the point of interface.

23. The method of claim 22, wherein the code is independent of a telephone number associated with the call.

24. The method of claim 22, wherein the code is a CIC code.

25. In a first interexchange communication network, a method of processing a call associated with a second interexchange communication network, comprising the steps of:

receiving a code associated with the call, the code identifying a carrier of choice, determining whether the code identifies the second network, when the code identifies the second network, identifying a preferred mode of service of the second network, and when the preferred mode of service is a virtual private line service,
  identifying a point of interface between the first and second networks, and
  routing the call to the second network through the point of interface.

26. The method of claim 25, wherein the code is independent of a telephone number associated with the call.

27. The method of claim 25, wherein the code is a CIC code.

* * * * *